US008805779B2

(12) United States Patent
Ficara et al.

(10) Patent No.: US 8,805,779 B2
(45) Date of Patent: Aug. 12, 2014

(54) APPLYING AN ACTION ON A DATA ITEM ACCORDING TO A CLASSIFICATION AND A DATA MANAGEMENT POLICY

(75) Inventors: Joseph S. Ficara, Shrewsbury, MA (US); Lawrence A. Stabile, Cambridge, MA (US); David J. Asher, Milford, MA (US); Mark A. Kaufman, Newton, MA (US); Jacob T. LeBlanc, Hudson, MA (US); Jeffrey L. West, Natick, MA (US); Michael R. Boucher, Shrewsbury, MA (US)

(73) Assignee: Longsand Limited (GB)

( * ) Notice: Subject to any disclaimer, the term of this patent is extended or adjusted under 35 U.S.C. 154(b) by 0 days.

(21) Appl. No.: 13/584,886

(22) Filed: Aug. 14, 2012

(65) Prior Publication Data

US 2014/0052689 A1 Feb. 20, 2014

(51) Int. Cl.
*G06F 7/00* (2006.01)
*G06F 17/00* (2006.01)

(52) U.S. Cl.
USPC ........................................................ 707/610

(58) Field of Classification Search
None
See application file for complete search history.

(56) References Cited

U.S. PATENT DOCUMENTS

| 8,364,713 | B2 * | 1/2013 | Pollard | 707/784 |
|---|---|---|---|---|
| 2010/0185656 | A1 * | 7/2010 | Pollard | 707/769 |
| 2010/0186066 | A1 * | 7/2010 | Pollard | 726/3 |
| 2010/0192170 | A1 * | 7/2010 | Raleigh | 725/1 |
| 2010/0269164 | A1 * | 10/2010 | Sosnosky et al. | 726/7 |
| 2010/0333116 | A1 * | 12/2010 | Prahlad et al. | 719/328 |
| 2011/0022825 | A1 * | 1/2011 | Spackman | 712/240 |
| 2011/0093471 | A1 * | 4/2011 | Brockway et al. | 707/747 |
| 2011/0295796 | A1 * | 12/2011 | Muhunthan et al. | 707/610 |
| 2012/0124307 | A1 * | 5/2012 | Ashutosh et al. | 711/162 |
| 2012/0136936 | A1 * | 5/2012 | Quintuna | 709/204 |
| 2012/0191677 | A1 * | 7/2012 | Lim | 707/694 |
| 2012/0215911 | A1 * | 8/2012 | Raleigh et al. | 709/224 |
| 2012/0240183 | A1 * | 9/2012 | Sinha | 726/1 |
| 2013/0042083 | A1 * | 2/2013 | Mutalik et al. | 711/162 |

OTHER PUBLICATIONS

Autonomy, an HP Company, Brochure entitled Human Information dated Mar. 2012 (16 pages).
Autonomy, an HP Company, www.autonomy.com, News Release, Autonomy Unveils Next-Generation Information Platform Built for "Human Information" Era, Nov. 2011 (3 pages).
Autonomy, an HP Company, Product Brief—Autonomy IDOL 10, Mar. 2012 (2 pages).
HP, News Advisory, Autonomy Unveils Next-Generation Information Platform Built for "Human Information" ERA, Nov. 2011 (4 pages).
Oracle, Endeca, Overview and Frequently Asked Questions—Oracle Buys Endeca dated before Jun. 2012 (4 pages).
Autonomy, an HP Company, Market Offering Brief, Marketing Optimization—Multichannel Marketing Performance Suite to Acquire and Convert Customers, Nov. 2011 (4 pages).
Autonomy, an HP Company, Product Brief, Intelligent Universal Search, Nov. 2011 (4 pages).
D'Antonio, Mila, Itol Media, News—Technology, Search Engine Marketing Goes Mainstream, May 2010 (2 pages).

(Continued)

*Primary Examiner* — Robert Beausoliel, Jr.
*Assistant Examiner* — Nicholas Allen

(57) ABSTRACT

A classifier classifies data to identify a class of the data. Based on the identified class, at least one action to apply to the given data item is determined according to the data management policy, where the data management policy specifies a plurality of actions to apply for different classes of data items.

19 Claims, 4 Drawing Sheets

(56) References Cited

OTHER PUBLICATIONS

Autonomy, an HP Company, Product Brief—Autonomy IDOL 10, Dec. 2011 (4 pages).

Autonomy, an HP Company, Product Brief—Autonomy Connected Backup, Nov. 2011 (4 pages).

Sean Blanch Flower et al., U.S. Appl. No. 13/535,475 entitled Processing Structured and Unstructured Data filed Jun. 28, 2012 (24 pages).

* cited by examiner

APPLYING AN ACTION ON A DATA ITEM ACCORDING TO A CLASSIFICATION AND A DATA MANAGEMENT POLICY

BACKGROUND

A user can have multiple electronic devices such as a desktop computer, notebook computer, tablet computer, smartphone, and so forth. Each of the electronic devices associated with a user can be used to access data and make modifications to data, such as word processing documents, presentation documents, and so forth. In some cases, data of an electronic device can be backed up to a separate storage system for data protection, or archived to the storage system to free up storage space at the electronic device.

BRIEF DESCRIPTION OF THE DRAWINGS

Some embodiments are described with respect to the following figures.

DETAILED DESCRIPTION

Figure 1:
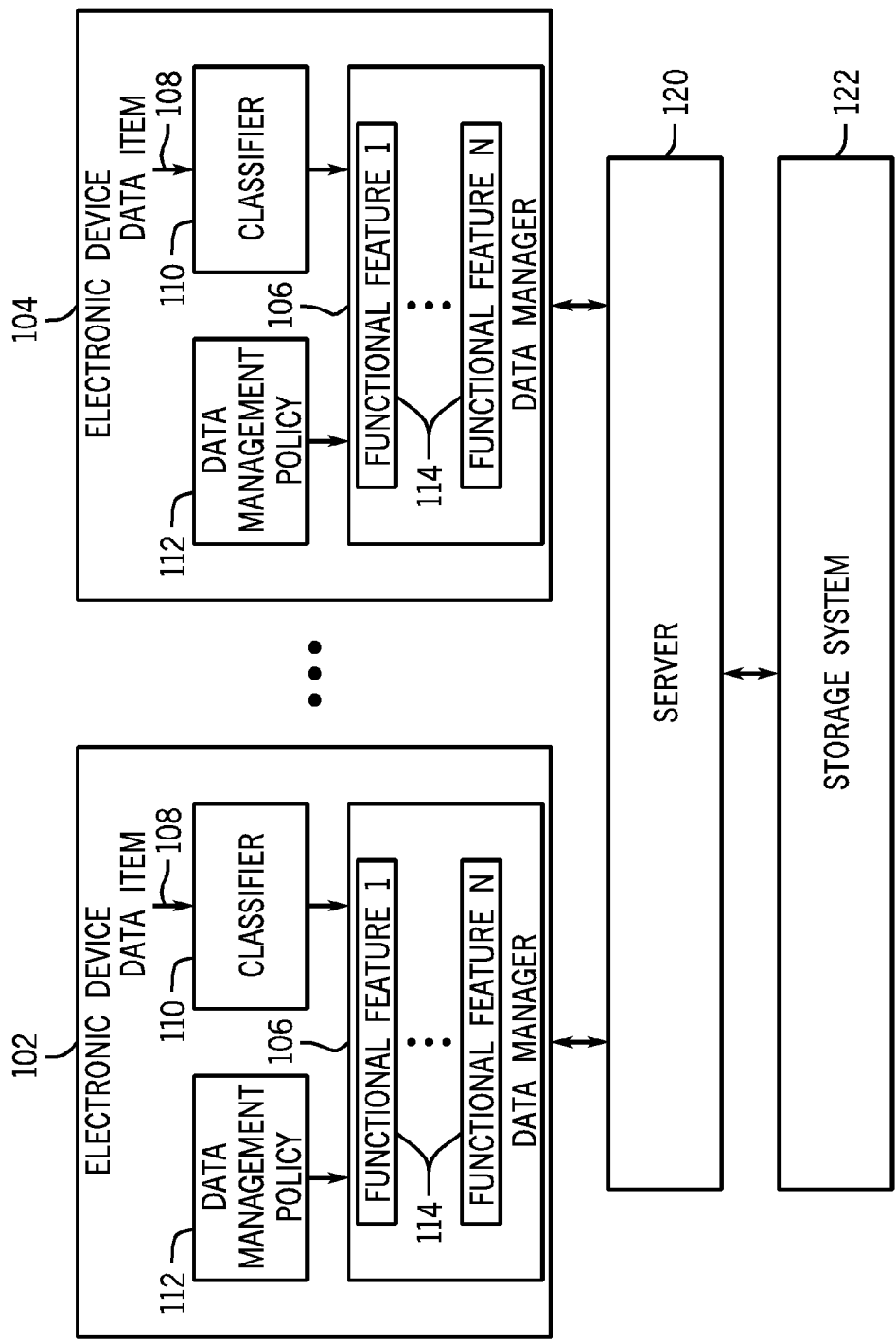
FIGS. 1 and 2 are block diagrams of example arrangements including various devices according to some implementations.

It can be relatively difficult to manage data that exists on various electronic devices of a user. As an example, the user can edit a document (e.g. word processing document, presentation document, spreadsheet, etc.) on a first electronic device, such as a desktop computer belonging to the user. Later, the user may travel to a different location where the user does not have access to the desktop computer, but the user may be carrying a mobile device such as a tablet computer, smartphone or notebook computer. In some cases, the latest version of the document that exists on a desktop computer may not be available to the user when the user is away from the desktop computer.

In an enterprise environment (e.g. an environment of a business concern, educational organization, government agency, etc.), server systems can also be provided to perform data management, such as to back up data, archive data, stub data, apply a data retention policy, apply a legal hold on data, and so forth. Backing up data of an electronic device at a storage system associated with a server system can allow for later recovery of data should a fault occur at the electronic device that leads to data corruption or loss. Archiving data allows the data to be moved from an electronic device for storage in a separate location to reduce consumption of storage resources at the electronic device. Stubbing data refers to removing a data item from an electronic device to a separate location while leaving a link (or "stub") that can be used to link to the data item at the separate location. The server system can apply a data retention policy to determine which data items to retain and which to delete. The server system can also apply a legal hold on data for legal reasons, such as to satisfy discovery obligations in litigation. There can be other data management actions that can be applied on data, such as understanding the confidentiality of data, determining whether encryption should be applied, determining whether data retention should be limited or whether expedited destruction should be applied. Other example data management actions include understanding the frequency at which data is generated to better forecast data growth, and understanding related expenses relating to bandwidth and storage consumption.

As users increasingly adopt multiple electronic devices, the management of data at the multiple electronic devices associated with a given user (to allow ready access of data at any of the multiple electronic devices from any other electronic device) in conjunction with performing various data management tasks at server systems can be challenging. In accordance with some implementations, to provide robust data management in an environment where a relatively large number of users can each have multiple electronic devices (e.g. desktop computers, notebook computers, tablet computers, smartphones, etc.), multiple functional features can be integrated into each electronic device for managing data items at the corresponding electronic device. Examples of data items can include word processing documents, presentation slides, image files, video files, audio files, and so forth.

The multiple functional features of an electronic device can provide at least some of the following: synchronizing data items among electronic devices of a given user (or group of users, such as a family, a department within an enterprise, etc.), where the multiple electronic devices of the user or group of users make up a private cloud of the user; backing up data to a remote storage system; archiving data to a remote storage system; stubbing data; applying a data retention policy with respect to the data; applying a legal hold on data; sharing the data of a first user with another user; compressing data; encrypting data; and so forth. The multiple functional features associated with data management that are integrated into the electronic device allow for various data management actions (any of the foregoing or any other action) to be selectively applied to data items, based on classification of the data items as discussed below. Note that making a decision to skip performing a data management action is also considered an action that can be selectively taken by the functional features of the electronic device.

In some implementations, a classifier can also be included in an electronic device for classifying a data item. Classifying a data item includes identifying a type (or class) of a data item based on information associated with a data item. The classification of a data item can be used to determine a sensitivity level of the data item, a confidentiality level of the data item, and so forth, which can be used to determine selected management action(s) to apply. In some examples, the classification can be based on content in the data item. In other examples, classification can be based on metadata associated with a data item, such as the file name of the data item, the file extension of the data item, and so forth. In further implementations, a data item can also be classified according to the type of electronic device (e.g. desktop computer, notebook computer, tablet computer, smartphone, etc.) where the data item resides or was created.

The electronic device can also maintain a predetermined data management policy. The data management policy can specify action(s) to be taken with respect to a data item based on the classification applied to the data item.

In accordance with some implementations, an integrated data management mechanism or technique is implemented by providing various functional features (such as those discussed above) in each electronic device, where selected actions can be applied by invoking any one or multiple of the functional features based on classification of each data item performed by the classifier and based on the data management policy maintained at the electronic device. In this manner, data accessibility is improved (e.g. a user can readily access a data item at any of the electronic devices in a private cloud, or a user can easily share data with other users to perform collaboration), and various data management functionalities offered by a data manager server system are also readily available. The server 120 can be implemented as a server computer, or a collection of server computers. The server 120 is coupled to a storage system 122, which can be implemented with a storage device or a collection of storage devices.

FIG. 1 is a block diagram of an example arrangement that includes electronic devices 102 and 104, which are coupled to a server 120, such as over a data network.

The electronic devices 102 and 104 can belong to the same user—in this scenario, the electronic devices 102 and 104 are part of a private cloud of the user. In other examples, electronic devices 102 and 104 can belong to different users. Although reference is made to a private cloud of the user, it is noted that techniques according to some implementations can also be applied in the context of a multi-tenant public cloud, which has multiple tenants that are able to access functionality of the public cloud, or in the context of a hybrid cloud that includes both a private cloud and public cloud.

The electronic devices 102 and 104 can include similar components, which are labeled with the same reference numerals in FIG. 1. The electronic device (102 or 104) can include a data manager 106, which is to perform a policy-driven action (or actions) with respect to a data item 108 based on a classification applied by a classifier 110 on the data item 108. The classification produces classification-derived information, which is used to drive the policy-driven data management that is based on a data management policy 112 maintained in the electronic device, where the data management policy 112 can be user-specified.

The classifier 110 classifies the data item 108 into a selected one of multiple types (or classes) of the data item. Based on the classification, various characteristics of the data item can be determined, including a sensitivity level of the data item, a confidentiality level of the data item, a context associated with the data item, and so forth. As examples, the data item can be classified as being a confidential document, a multimedia file such as a music file or video file, an old document that has an age past a predefined age threshold, a legal document that is subject to a legal hold policy, a collaboration document that is to be collaborated among multiple users, a document that is to be synchronized among multiple devices in a private cloud of a given user, and so forth. The classification of the data item 108 can also be based on the type of electronic device at which the data item 108 resides or was created. Based on the classification applied on the data item 108, the data manager 106 can invoke at least one of multiple functional features 114 that apply corresponding actions on the data item 108. Examples of various functional features 114 are listed above. Note that plural ones of the functional features can be invoked to perform respective plural management actions with respect to the data item, based on the classification of the data item. As another example, note that a possible action that can be taken by the data manager 106 based on the classification of the data item 108 and the data management policy 112 is a decision to skip the invocation of any of the functional features 114.

In a specific example, if the classifier 110 classifies the data item 108 as being a data item that is to be synchronized in a private cloud, the data manager 106 can invoke a synchronization feature (one of the functional features 114) for synchronizing the data item 108 among multiple electronic devices in the private cloud of the user. Synchronizing data among multiple electronic devices (in the private cloud) of a given user (or group of users) refers to maintaining synchronization of data items as they are being modified. A change in a first data item at a first electronic device in the private cloud can be communicated to the other electronic device(s) of the private cloud, such that the change can also be applied to a version of the first data item that may be kept at the other electronic device(s). Such synchronized data in the private cloud of the user is readily accessible by the user regardless of the electronic device the user is using or where the user is located.

As a further example, based on the classification, multiple management actions can be performed, including data synchronization as well as any one or multiple of the following: encrypt the data item 108 because the data item was identified as being confidential; notifying legal personnel to review the data item because the data item was identified as one that may be impacted by a litigation; creating an audit trail based on the notification, and so forth. Note that the notification and audit trail creation are examples of ancillary actions that are not applied on the data item, but are performed in addition to actions on the data item.

As another example, the data item 108 can be classified as a music file. In this case, the data management policy 112 can specify that compression and encryption (which can be provided by respective functional features 114) are not to be applied to the music file. However, a backup feature (one of the functional features 114) is invoked by the data manager 106 to back up the music file to a remote storage system, such as the storage system 122 coupled to a server 120.

As a further example, the data item 108 may be classified as one that may be subject to potential copyright protection. In this example, the management action specified can be a decision to avoid backup of the data item 108 to avoid copyright violations. Additionally, a notice(s) can be sent to a user (and compliance personnel) to indicate that certain material may be associated with copyright protection issues, and an audit trail can be created that contains a record of the notice(s).

As another example, the classifier 110 can classify the data item 108 as being a data item that is to be archived, such as in cases where the data item has an age that is greater than some predefined age threshold, or where the data item satisfies another predefined archival criterion. In this case, the data management policy 112 can specify that the data item to be archived is to be removed from the electronic device and moved to the remote storage system 122 for storage. Archiving can be performed in conjunction with stubbing, where a link to the removed data item can be kept at the electronic device. The link can be used at the electronic device to access the data item at the remote storage system 122. From the perspective of a user of the electronic device, it appears that the data item is still resident at the electronic device, and can be accessed on demand.

Stubbing can also be employed in the context of data restoration. For example, data determined to be most immediately useful to the user can be restored first, while the rest of the data can be restored as stubs. A determination of what is immediately useful can be based on any one or combination of the following, in some examples: classification derived information, frequency of use, or recency of use.

Data corresponding to the stubs can be gradually restored in the background, with the restored data replacing the corresponding stubs. This "intelligent" restoration approach can allow the user to get up and running more quickly by first providing the user immediate access to more important data, with access to the remaining (less important) data provided with slight delay.

As another example, the classifier 110 can classify the data item 108 as being of a type that is subject to a hold, such as for legal reasons. In this case, the data management policy 112 can specify that such a data item that is subject to a legal hold is to be backed up to the storage system 122 to prevent loss of this data item. Also, metadata can be associated with the data item 108 that is subject to the legal hold to prevent deletion of this data item.

As another example, the classifier 110 can classify the data item 108 as being a collaborative data item, in which case the data management policy 112 can specify that the data item is to be shared with any electronic device of another user(s).

Other examples relating to classification of the data item 108 and corresponding action(s) to be taken based on the data management policy 112 are also possible.

Figure 2:
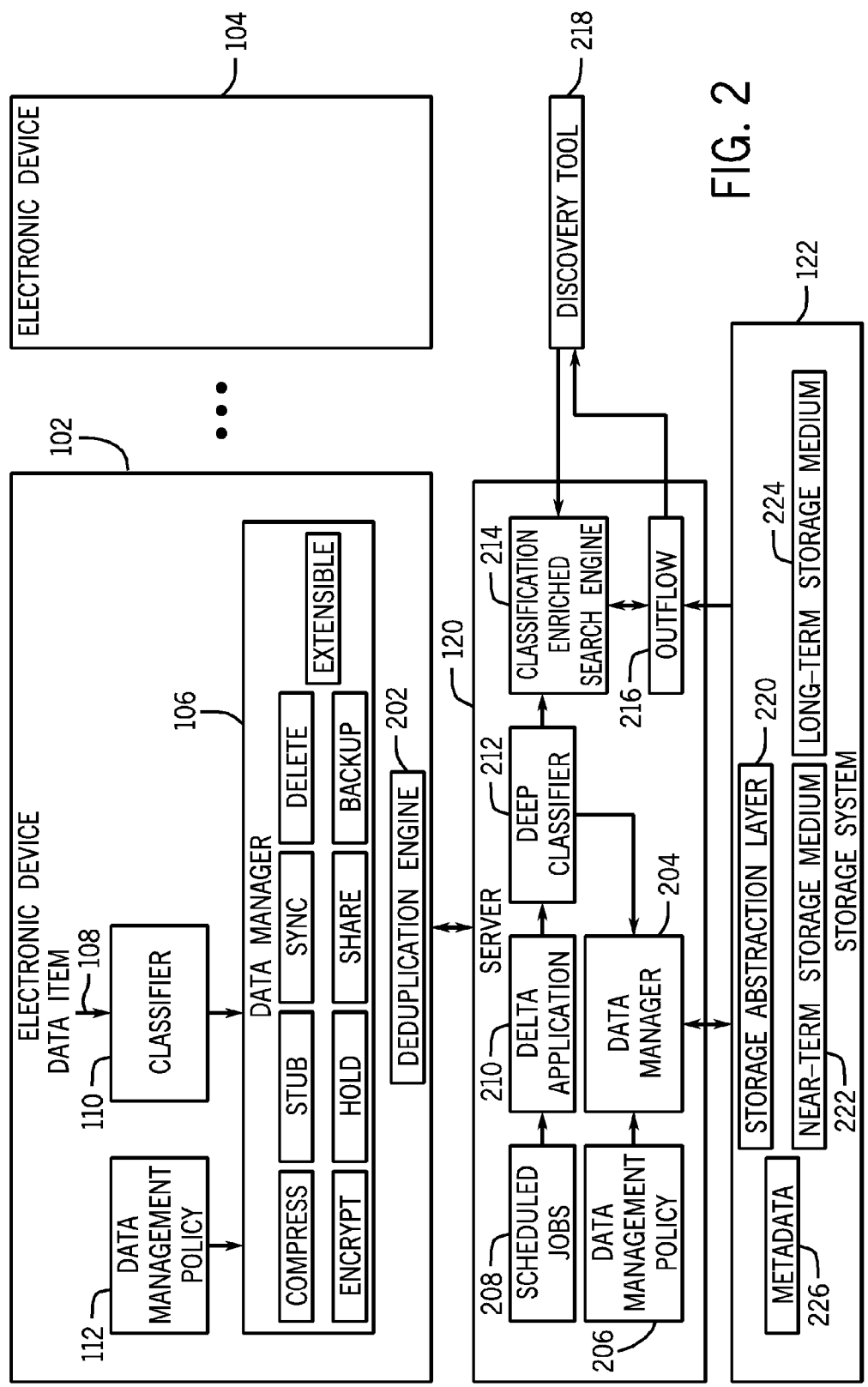

FIG. 2 is a block diagram of an example arrangement according to further implementations. The components of the electronic device 102 that are the same as those depicted in FIG. 1 are assigned the same reference numerals. In the FIG. 2 example, the data manager 106 is depicted to have specific functional features, including the following: a compress feature (to compress a data item); an encrypt feature (to encrypt a data item); a stub feature (to remove a data item having a predetermined characteristic from the electronic device 102 to store in the storage system 122, and to include a link to the removed data item at the electronic device 102); a hold feature (to apply a hold policy to a data item, such as for a legal reason); a sync feature (to synchronize a data item among electronic devices in a private cloud of a user); a share feature (to share a data item between users); a delete feature (to delete data items according to a data retention criterion); a backup feature (to back up a data item to the storage system 122); and an extensible feature (to extend functionality of the data manager 106).

Note that the compress feature can apply compression on a data item that can selectively use any one of multiple compression approaches. For example, a selected compression approach may be based on the data item's content and resource utilization goals (e.g. processing resources used for compression should not exceed a target number of processors or a target processing time).

The extensible feature of the data manager 106 can be used to add additional functional features to the data manager 106, such as by use of plug-in modules or by some other mechanism.

The electronic device 102 of FIG. 2 also includes a deduplication engine 202, which can be used to apply deduplication of data. In performing deduplication, the deduplication engine 202 can identify a first portion of a data item that is already available at the storage system 122, and a second portion of the data item that is not available at the storage system 122 (or at another location). As part of the deduplication, the deduplication engine 202 avoids sending the first portion (since it is already available at the storage system 122 or at another location), but instead sends just the second portion to the server 120 for storing at the storage system 122 (or at another location).

In some examples, deduplication can be based on chunking a data item, where the data item is divided into chunks. The deduplication engine 202 can identify chunks of the data item that are already available at the storage system 122 or at another location, and thus can avoid sending such chunks again to the server 120. Instead, the deduplication engine 202 can send just chunks of the data item 108 that are not already available at the storage system 122 or at another location. In this way, each chunk of a data item is stored just once. Note that common chunks can actually be shared among multiple data items—deduplication would also cause such chunks that are shared among multiple data items to be stored just once at the storage system 122 or at another location. In other implementations, other deduplication techniques can be used.

In addition to the various data management functionalities in each electronic device, the server 102 can also include data management functionalities that can cooperate with, or supplement, the data management features of the electronic device.

The server 120 of FIG. 2 includes a data manager 204, which can include similar functional features as the data manager 106 in the electronic device 102. The server 120 also includes a data management policy 206 (which can be user-specified), which specifies a policy to be applied by the data manager 204 on a data item being processed by the server 120.

Scheduled jobs 208 in the server 120 refer to jobs relating to processing of data items in response to data provided by the electronic devices 102 and 104 to the server 120.

Note that data received from an electronic device can be partial data, due to the duplication applied by the deduplication engine 202 in the electronic device. As a result, a delta application module 210 is provided in the server 120 to reproduce an original data item from partial data that is received from an electronic device 102. As an example, an original data item at the electronic device may have ten chunks. Due to deduplication, only 4 out of the 10 chunks may have been sent by the electronic device to the server 124 for handling. The delta application module 210 in the server 120 can recreate the original data item from the 4 chunks, by pulling the remaining 6 chunks from the storage system 122 (or from another location).

The recreated data item is then provided to a "deep" classifier 212 in the server 120. The deep classifier 212 can apply a deeper classification on the recreated data item than applied by the classifier 110 at an electronic device. For example, the classifier 110 at an electronic device may apply classification of a data item based on metadata of the data item and based on a portion of content in the data item. The deep classifier 212 can apply further classification based on the entirety of the content of the data item (as well as the metadata associated with the data item). Performing deep classification at the server 120 allows data management techniques according to some implementations to leverage greater processing resources available at the server 120, while reducing processing resource consumption at client devices. Note that the processing resources of the server 120 are more scalable than processing resources at the client devices, since additional processing resources can be dynamically added to the server 120 on demand in some examples. Performing the deep classification at the server 120 also allows for re-processing of data already collected that the user has chosen to not classify, or after newer or better classifiers or classification rules are made available (in other words, the classification technique has been updated).

Based on the classification applied by the deep classifier 212 on a data item, the data manager 204 can perform a policy-driven action according to the data management policy 206 at the server 120, which can include actions such as compression, encryption, archiving, stubbing, holding, synchronization, sharing, deletion, notification, auditing, other ancillary actions that go beyond actions on the data item, and so forth.

To the extent that the action performed by the data manager 204 involves storing data to or retrieving data from the storage system 122, the data manager 204 is able to communicate such data with the storage system 122. Also for purposes of synchronization, the data manager 204 can cause a data item received from a first electronic device to be communicated to one or multiple other electronic devices.

The server 120 also includes a classification-enriched search engine 214, which can perform a search for data (in the storage system 122 or in another location such as any of the electronic devices 102 and 104). The classification-enriched search engine 214 is able to use classification information provided by the deep classifier 212 to find data items in the storage system 122 and/or other storage locations that satisfy search criteria in a search request and that are related to a particular class (or classes) identified by the classifier 212. For example, the classification-enriched search engine 214 can find data items for which a legal hold applies and which satisfy a search criterion or search criteria in a search request. As a further example, the classification-enriched search engine 214 can perform searching for the purpose of understanding data growth, and to provide the ability to manage relatively large amounts of data for efficient but accurate global actions such as authorization of the deletion of data that is deemed eligible for deletion using heat maps and other cluster-based visualizations of data.

The server 120 also includes an outflow module 216, which provides a query interface, such as an application programming interface, to allow interaction between the classification-enriched search engine 214 and a discovery tool 218. The discovery tool 218 can be used to manage data items for litigation, such as data items that are responsive to litigation-related document requests for production, or data items specified by court order or rules. The outflow module 216 can restore a specific version of a data item from the storage system 122, can apply a delta operation to recreate a full data item from partial data (due to deduplication), and so forth. The discovery tool 218 can view, classify, apply legal hold (by copying), or perform other tasks with respect to retrieved data items. This can allow third party access of the retrieved data items in some examples.

As further depicted in FIG. 2, the storage system 122 can include a storage abstraction layer 220 to abstract an interface that is presented to the server 120. In addition, the storage system 122 can include a near-term storage medium 222 (implemented with one or multiple storage devices) and a long-term storage medium 224 (implemented with one or multiple storage devices). Generally, the storage device(s) of the near-term storage medium 222 can be more expensive (and have higher performance with respect to one or multiple performance metrics) than the storage device(s) of the long-term storage medium 224.

In some examples, the near-term storage medium 222 can be used to store the following types of data items: data items synchronized in a private cloud (such as different versions of each such synchronized data item); data items to be shared among users (such as different versions of each such shared data item); backed up data items; and so forth. The long-term storage medium 224 can be used to store archived data items, for example.

The storage system 122 can also store metadata 226 associated with the data items handled by the server 120. For example, the metadata 226 can include indications of classifications of each corresponding data item, information specifying that a legal hold is to be applied to a corresponding data item, and so forth.

Figure 3:
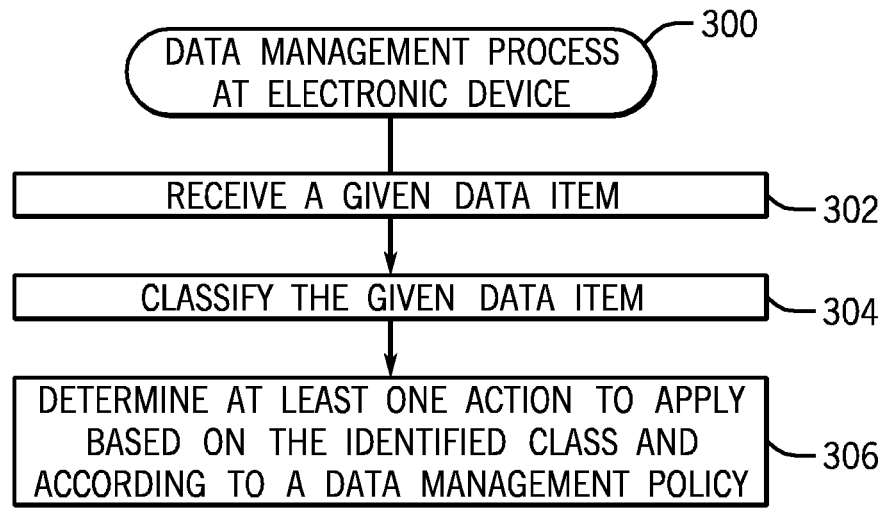
FIG. 3 is a flow diagram of a data management process at an electronic device, according to some implementations.

FIG. 3 is a flow diagram of a data management process 300 according to some implementations. The data management process 300 can be performed by components in any electronic device, such as electronic device 102 or 104 in FIG. 1 or 2. The electronic device receives (at 302) a given data item (such as data item 108 in FIG. 1 or 2). The classifier 110 in the electronic device classifies (at 304) the given data item to identify a class of the given data item (from among the multiple classes). Based on the identified class, the data manager 106 determines (at 306) at least one action to apply according to the data management policy 112. The action to apply can be selected from among the actions associated with the various functional features depicted in FIG. 1 or 2. In some cases, the selected action can be a decision to skip invoking any of the functional features in the electronic device.

Figure 4:
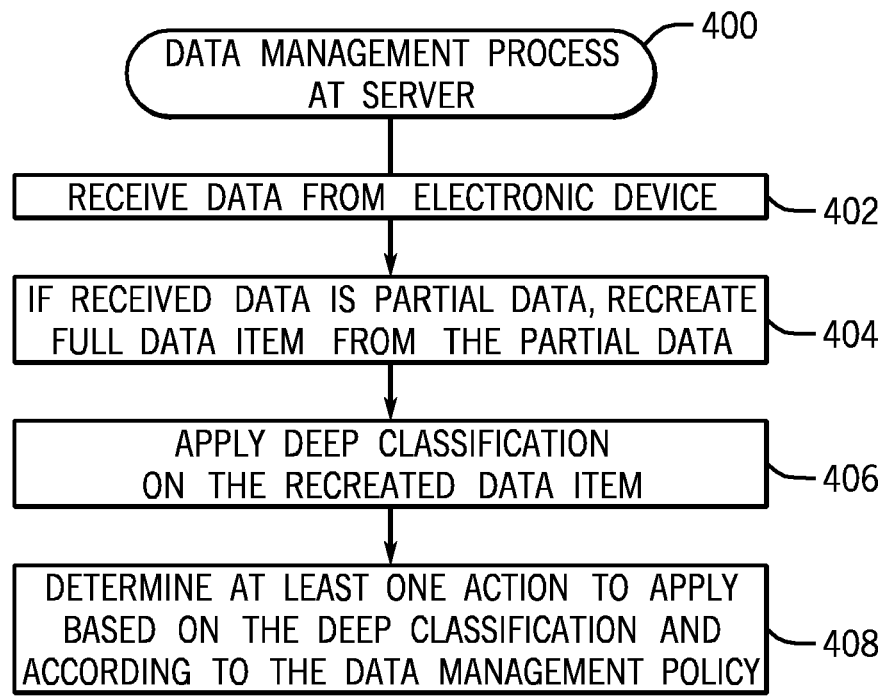
FIG. 4 is a flow diagram of a data management process at a server, according to some implementations.

FIG. 4 is a flow diagram of a data management process 400 performed at the server 120 of FIG. 1 or 2. The server 120 receives (at 402) data from an electronic device, where the received data can be partial data (due to deduplication applied at the electronic device). If the received data is partial data, then the delta application module 210 of the server 120 recreates (at 404) a full data item from the partial data. For example, if the received partial data includes a subset of the chunks of the full data item, the delta application module 210 is able to retrieve the remaining chunks (such as from the storage system 122) to combine with the received chunks to form the full data item.

The deep classifier 212 in the server 120 then applies (at 406) deep classification on the recreated data item, to identify a class of the recreated data item. Based on the classification, the data manager 204 in the server 120 determines (at 408) at least one action to apply to the recreated data item according to the data management policy 206 in the server. The action(s) can include various actions similar to those in the electronic device, except that the selected action in the server 120 is based on the deep classification.

Figure 5:
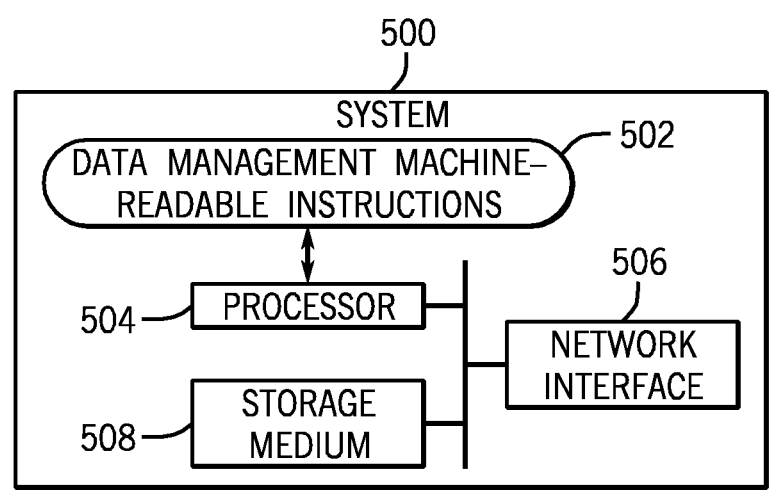
FIG. 5 is a block diagram of a system according to some implementations.

FIG. 5 depicts a system 500, which either be the electronic device 102 or 104, or the server of FIG. 1 or 2. The system 500 includes data management machine-readable instructions 502, which can be any of the various modules depicted in FIG. 1 or 2 that are in the electronic device or server. The data management machine-readable instructions 502 are loaded for execution on a processor or processors 504. A processor can include a microprocessor, microcontroller, processor module or subsystem, programmable integrated circuit, programmable gate array, or another control or computing device.

The processor(s) 504 can be coupled to a network interface 506 (to allow the system 500 to perform communications over a data network) and a storage medium (or storage media) 508.

The storage medium or storage media 508 can be implemented as one or multiple computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
receiving, by a particular electronic device of a private cloud of electronic devices belonging to a user, a given data item;
classifying, by the particular electronic device, the given data item to determine a class of the given data item;
based on the classifying, determining, by the particular electronic device, at least one action to apply to the given data item according to a predetermined data management policy specifying a plurality of actions to apply for different classes of data items, the actions including synchronizing a data item with another electronic device of the private cloud, placing a hold on a data item, and sharing a data item among users;
applying, by the particular electronic device, deduplication on the given data item to determine a first portion of the given data item that is already available at a server, and a second portion that is not already available at the server; and
sending, by the particular electronic device, the second portion of the given data item to the server for handling, without sending the first portion, wherein the handling includes applying, by the server, classification of the given data item at a deeper level based on content of the given data item not considered by the classifying by the particular electronic device, and based on the classification at the deeper level, the server determining at least one further action to apply to the given data item according to a predetermined data management policy at the server.

2. The method of claim 1, wherein the plurality of actions further include backing up a data item to a remote storage location or archiving a data item based on a characteristic of the data item.

3. The method of claim 1, wherein the plurality of actions further include stubbing a data item by removing the data item from the particular electronic device, storing the removed data item at a remote storage location, and adding a link to the removed data item at the particular electronic device.

4. The method of claim 1, wherein the plurality of actions further include deleting a data item according to a data retention criterion.

5. The method of claim 1, wherein the plurality of actions further include compressing a data item and encrypting a data item.

6. The method of claim 1, wherein the predetermined data management policy that specifies the plurality of actions further specifies performance of an ancillary action that is in addition to the at least one action applied to the given data, and wherein the method further comprises:
performing the ancillary action based on the classifying.

7. The method of claim 1, wherein the at least one action includes synchronizing the given data item by the particular electronic device with the at least another electronic device, the particular electronic device and the at least another electronic device belonging to the user.

8. The method of claim 1, wherein the plurality of actions are applied by invoking respective functional features in the particular electronic device, and wherein the applied at least one action includes deciding to skip invoking any of the functional features based on the classifying and according to the predetermined data management policy.

9. The method of claim 1, further comprising:
performing restoration of data items at the particular electronic device, wherein the restoration includes first restoring a subset of the data items and restoring stubs corresponding to a remainder of the data items,
wherein the restoration further includes gradually restoring the remainder of the data items corresponding to the stubs after first restoring the subset of the data items.

10. An article comprising at least one non-transitory machine-readable storage medium storing instructions that upon execution cause a server to:
receive data from an electronic device;
apply classification, by a classifier, on the data to identify a class of the data, wherein the applied classification at the server is different from data classification on the data performed at the electronic device; and
based on the classification, determine at least one action to apply to the data according to a predetermined data management policy, where the predetermined data management policy specifies a plurality of actions to apply for different classes of data, the plurality of actions including synchronizing data among electronic devices in a private cloud, and sharing data among users.

11. The article of claim 10, wherein the received data is partial data due to deduplication applied at the electronic device, and wherein the instructions upon execution cause the server to further:
recreate a data item from the partial data,
wherein applying the classification on the data comprises applying the classification on the data item, and wherein the classification on the data item is based on content of the data item not considered by the data classification of the data item performed at the electronic device.

12. The article of claim 10, wherein the instructions upon execution cause the server to perform a classification-enriched search in response to a search request and according to the classification by the classifier.

13. The article of claim 12, wherein the instructions upon execution cause the server to interact with a legal discovery tool that manages data items for litigation.

14. The article of claim 10, wherein the plurality of actions further include compressing the received data, where the compressing selectively uses one of multiple compression approaches, the selecting based on content of the received data and a resource utilization goal.

15. The article of claim 10, wherein the classification applied at the server allows re-processing of the data for performing classification in a scenario where classification was skipped at the electronic device, or in a scenario where a classification technique has been updated since a classification performed on the data at the electronic device.

16. The article of claim 10, wherein the electronic devices in the private cloud belong to an individual user.

17. A server comprising:
a storage medium to store a data management policy;
at least one processor to receive data from an electronic device;
a classifier executable on the at least one processor to classify a given data item derived from the received data to identify a class of the given data item, wherein the classifying is a deeper classification of the given data item than a classification of the given data item performed at the electronic device, the deeper classification considering content of the given data item not considered by the classification of the given data item performed at the electronic device; and a data manager executable on the at least one processor to:
based on the identified class, determine at least one action to apply to the given data item according to the data management policy, where the data management policy specifies a plurality of actions to apply for different classes of data items, the plurality of actions including synchronizing a data item with at least another electronic device in a private cloud of a user, backing up a data item, and sharing a data item among users.

18. The server of claim 17, further comprising a plurality of functional features invocable by the data manager, where the selected at least one action includes invocation of at least one of the plurality of functional features, or a decision to skip invocation of the functional features.

19. The server of claim 17, wherein the received data is partial data due to deduplication at the electronic device, and the server further comprises a data replication module to recreate the given data item from the partial data.

* * * * *